June 18, 1957 H. A. EDMONDS 2,796,172
CHECK WEIGHING SCALE APPARATUS
Filed Oct. 10, 1952 2 Sheets-Sheet 1

INVENTOR.
HARVEY A. EDMONDS
BY R. L. Story
ATTORNEY

June 18, 1957  H. A. EDMONDS  2,796,172
CHECK WEIGHING SCALE APPARATUS
Filed Oct. 10, 1952  2 Sheets-Sheet 2
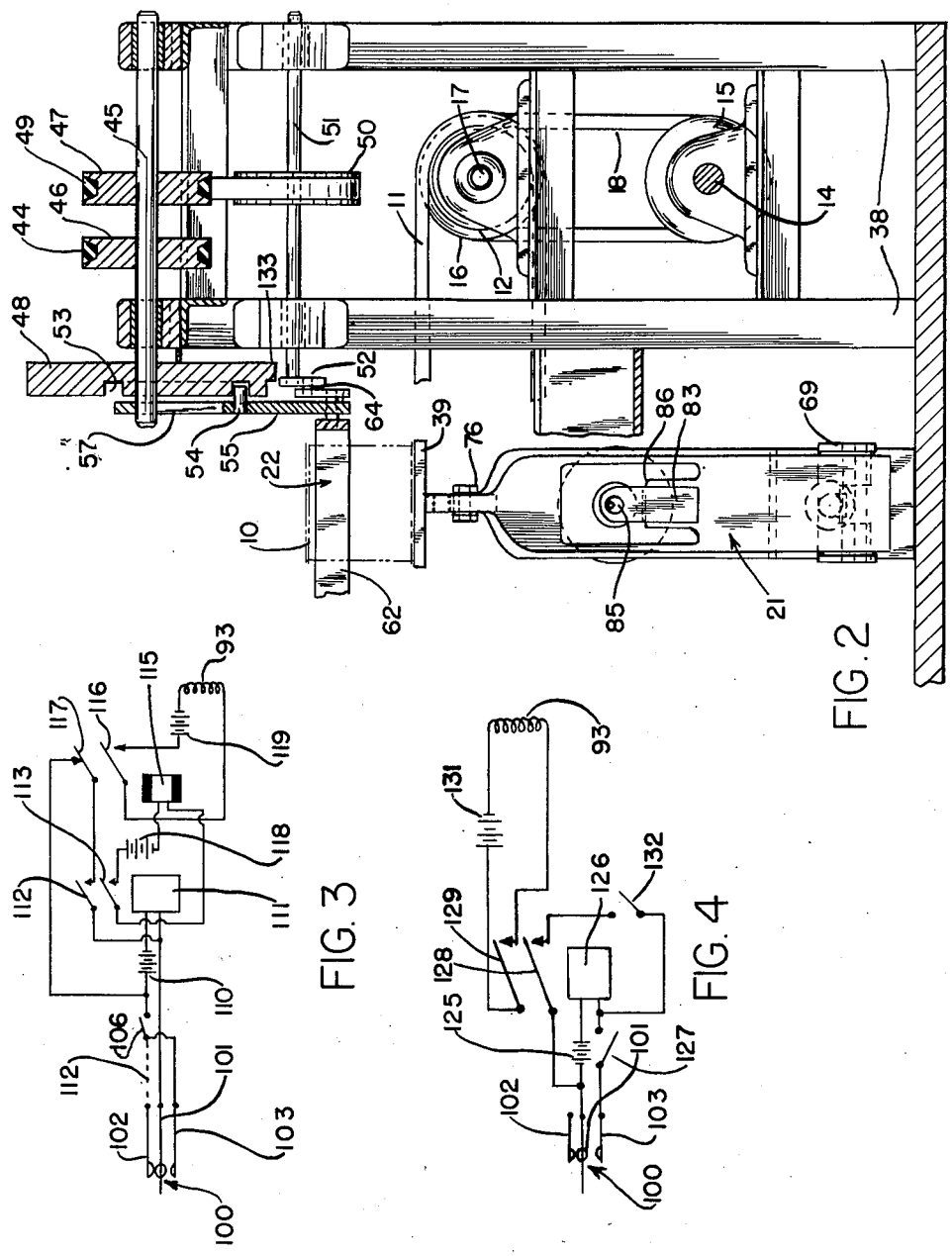
HARVEY A. EDMONDS
*INVENTOR.*
BY R. T. Story
ATTORNEY United States Patent Office 2,796,172
Patented June 18, 1957

2,796,172
CHECK WEIGHING SCALE APPARATUS

Harvey A. Edmonds, Chicago, Ill., assignor to Swift & Company, Chicago, Ill., a corporation of Illinois Application October 10, 1952, Serial No. 314,000

8 Claims. (Cl. 209—121)

The present invention relates to a device for use in check weighing.

In packaging product that is sold by weight, as for example food, there are two procedures that may be followed. The "catch weight" system in which the weight of each package, or, as more generally referred to herein, each unit is separately measured and then marked on the package, and the standard weight system in which a given volume of product is packaged with the intention that it will weigh about a given amount. The advantage of the catch weight system is that one knows exactly what amount is being bought and sold, but there is a great disadvantage in the extent of the expensive manual labor involved in individually weighing and marking each unit.

While the second practice eliminates the expense of this manual labor, it is usually necessary that a greater volume (and weight) of product be inserted into the container or package to make sure that the weight of each package is no less than the weight specified on the unit. In other words, provision must be made for variations in specific weight by allowing tolerances above the weight which has been decided upon for the unit. In many instances such tolerances must be relatively large to insure that the purchaser is not getting less than that bargained for. The large tolerances mean that in most packages the vendor is delivering to the purchaser more product than the purchaser is agreeing to buy and to pay for. Obviously this is the same as giving away the seller's goods and may be a substantial expense in the operation of the business.

The principal object of the present invention is to provide a device for check weighing the packages to insure that they are at least the quantity that has been specified. Such a practice insures that the various laws and regulations relating to weights of goods sold are not being violated while at the same time has the additional advantage that closer tolerances may usually be specified thereby saving the packer money by, on the average, reducing the overage that is delivered to the purchaser but for which no payment is received.

A further advantage of the present invention is that it is sufficiently fast in operation so that it will not impair the productive capacity of a plant. In the majority of cases the packaging of product has been reduced to automatic machine operations because of the savings in operating costs thereby attained. The present invention may be arranged to receive the output of such packaging machinery with the installation of the present invention being based upon the output of the present packaging machinery.

In the usual case there is a substantial period of time required for the scale to stop oscillating and come to a balance. In the present invention this time has been cut to a minimum by very close snubbing of the scale movement. Embodiments of the present invention will come to a balance in a tenth of a second or less. Because of this, the speed with which the check weighing can be performed will be limited by the rapidity with which the units to be weighed can be moved on and off the scale rather than by the time required for the actual weighing operation as is usually the case.

Additional objects and advantages include: A device that is relatively simple in construction and is low in first cost; a device which does not require operator supervision; and a device which is easily maintained and which does not require special skills to maintain.

Other objects and advantages will become apparent from the following description taken in conjunction with the drawings, in which:

Figure 2 is a section taken at line 2—2 of Figure 1.

Figure 3 is a schematic diagram of the wiring used, and

Figure 4 is an alternative form of wiring.

Figure 1:
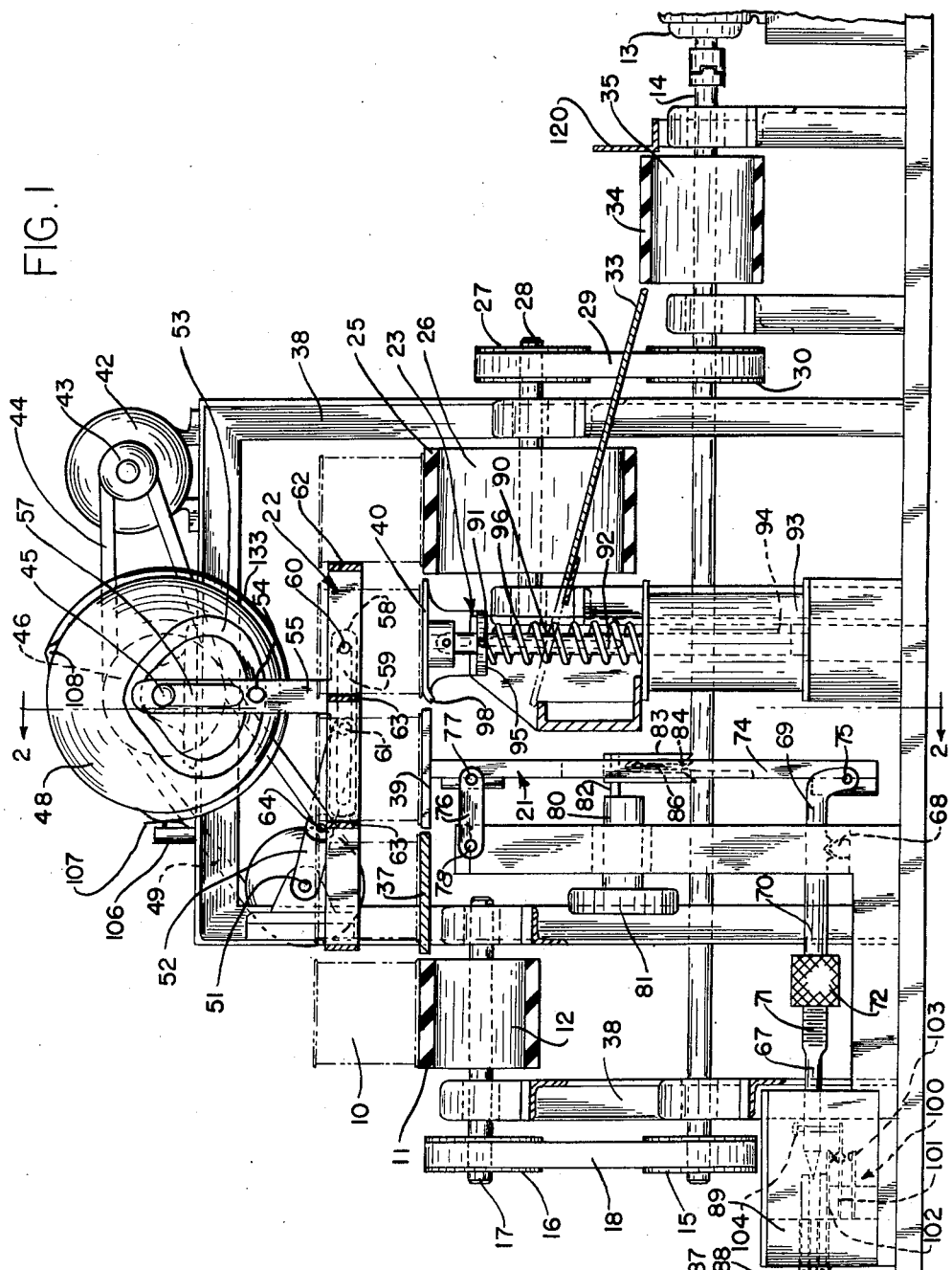
Figure 1 is an elevation partially in section of an embodiment of the invention.

Figure 1 illustrates an embodiment wherein the units which are to be check weighed to make sure that they do not fall below a predetermined minimum are cans 10. The cans are brought to the weighing device on a belt 11 carried on a pulley 12. Belt 11 and pulley 12 are driven by a motor 13 through a shaft 14 upon which shaft a pulley 15 is mounted to connect to a pulley 16 on shaft 17 by means of a belt 18. Suitable well-known means, not shown, may be used to stop the cans 10 at a point on belt 11 at a proper position to be transferred across the scale platform in a direction normal to the path of travel of belt 11.

The cans are moved across the scale, generally 21, by a power pusher means, generally 22. After the cans are check weighed on scale 21 they pass across a switch, generally 23, to one or the other of two discharge conveyors. The first of these conveyors is a belt 25 mounted on a pulley 26. Both pulley 26 and a driving pulley 27 are attached to a shaft 28 and are driven by a belt 29 from a pulley 30 attached to shaft 14. The second discharge conveyor comprises chute 33 and a belt 34 mounted on pulley 35, which pulley in turn is attached to shaft 14.

A fixed platform 37 attached to the frame 38 of the machine, the platform 39 of scale 21 and the head 40 of switch 23 form a conveying surface across which the cans are moved by the pusher means 22, and these elements have been referred to generally herein as a conveyor. The pusher means 22 is driven by a motor 42 having an output pulley 43 driving a belt 44. A jack shaft 45 carries two pulleys 46 and 47 and a wheel 48. Pulley 46 receives belt 44 and is driven thereby, while pulley 47 drives a belt 49, which in turn engages a pulley 50. Pulley 50 is attached to a crank shaft 51 to which is also attached a crank 52.

Wheel 48 has a cam slot 53 forming a box cam in which is engaged a cam follower 54 attached to a lifting arm 55. Lifting arm 55 is permitted limited vertical movement by reason of a slot 57 therein which slot hooks over shaft 45. At its lower end lifting arm 55 carries a transverse arm 58 having a slot 59 therein. Pusher means 22 includes a pusher head 62. A pair of pins 60 and 61 attached to pusher head 62 travel in slot 59 and support pusher head 62 from arm 55. A connecting rod 64 is attached at one end to pin 61 and at the other to crank 52.

As motor 42 operates the power pusher means 22 from the position illustrated in Figure 1 the initial movements of the pusher head 62 are slowly backward and up. After the pusher head 62 has passed above the tops of cans 10 by reason of the lifting force applied to cam follower 54 by box cam 53, crank 52 moves the pusher head 62 to the rear, i. e. to the left, in Figure 1. Pusher head 62 has a plurality of cross members 63 dividing the head into a plurality of sections. The further rotation of the box cam permits the pusher head 62 to lower with the rear section of the pusher being looped over the top of the can 10 on belt 11. Crank 52 then moves the pusher head forwardly, carrying that can from belt 11 onto the platform 37. At the same time, the can that was on platform 37 is shoved over onto scale platform 39, while the can formerly on scale platform 39 is transferred onto the head 40 of switch 23. If switch 23 had remained closed so that a can had stayed on the top thereof, that can is moved onto belt 25.

Scale 21 includes a scale beam 67 supported on a pivot 68 to which pivot divides the beam into a short arm 69 and a long arm 70. A portion of scale beam 67 is threaded at 71 to receive a counterbalance 72. A connecting member 74 is attached at the upper end to scale platform 39 while at the lower end the member is pivotally secured to short arm 69 of scale beam 67 by means of a pin 75. The upper end of connecting member 74 is held in a substantially vertical position by means of arms 76 attached at one end to the connecting member 74 by means of a pin 77 and at the other end to a portion of frame 38 by means of a pin 78. Pins 77 and 78 provide rotative connections of the arm 76 to the connecting member 74 and frame 38.

Where the scale is to be consistently used for check weighing objects of only a single minimum weight, provision may be made for periodically ascertaining whether or not the scale has retained its accuracy. Means for this purpose may comprise a shaft 80 journaled in frame 38. At one end of the shaft 80 is secured a hand wheel 81, while at the other end is a pin 82 eccentrically mounted with respect to the axis of rotation of the shaft 80 in frame 38. A check weight 83 having a base with a vertical slot 84 therein is hung over pin 82. A hole 85 in the upper portion of check weight 83 receives pin 82 and is slotted in a vertical direction so as to allow a vertical movement of the check weight with respect to the pin. An abutment 86 on connecting member 74 slides up into slot 84 in the base of the check weight (Figure 2).

With hand wheel 81 rotated so that pin 82 is upwardly, the check weight 83 is lifted free of the top of abutment 86. However, when the hand wheel 81 is rotated so as to lower pin 82, the check weight is hung on abutment 86 with the opening 85 in the top of the check weight allowing the check weight to hang on the connecting member 74 free of the pin 82. This imposes an unvarying load upon scale beam 67 so that the accuracy of the scale may be checked and, if necessary, the counterbalance may be moved back and forth to reset the scale. After resetting, the counterbalance 72 is locked in place and the check weight removed by rotating hand wheel 81. The scale is then ready for normal operation.

An important feature in the operation of the invention is the close snubbing of scale beam 67. This is achieved by the use of a pair of pins 87 and 88, threaded into a block 89 forming a part of the frame of the scale. The pins are positioned generally parallel to the longitudinal axis of beam 67 and to either side of the end of the long arm 70 thereof. As will be seen in Figure 1, the end of the long arm 70 tapers towards a point. This taper plus the threaded adjustment of pins 87 and 88 permits very accurate setting of the amount of movement of the end of the scale beam 67.

The amount of movement of the end of the long arm 70 of the scale beam 67 is set by pins 87 and 88 so as not to exceed about 1/16 of an inch. Preferably this movement is kept under about 1/32 of an inch. This very limited movement of the scale beam causes the scale to stop oscillating and settle in a position for taking a weight within an extremely short period of time. The proportions of the scale beam are such that with this limited movement of the end of the scale beam the movement of the head 40 is extremely small.

In addition to head 40, switch 23 includes a rod 90 to which the head 40 is attached by means of a pin 91. Rod 90 is divided into two portions, the upper portion 92 being of magnetic material to serve as the armature for a solenoid 93, while the lower portion 94 is of non-magnetic material and merely functions as a guide for the rod. A spring 96 encircles rod 90 between the upper face of solenoid 93 and an abutment 95 at the base of switch head 40. The urging of the spring against the abutment 97 serves to press the head 40 into a position at which its upper surface is in a plane normal to the axis of rod 90.

When the solenoid is energized to lower the head 40 to the dotted position shown in Figure 1, a lip 98 on head 40 contacts a portion of frame 38 to tip head 40 about pin 91 so that the upper face of the head aligns itself with chute 33. When the solenoid is again de-energized, spring 96 pushes the head 40 back into the position shown in full lines in Figure 1 and straightens the position of the head.

A switch, generally 100, is operated by the movement of scale beam 67. In the illustrated embodiment the switch 100 includes three contacts, a center contact 101, an upper contact 102 and a lower contact 103, each mounted on a flexible arm forming a part thereof. Center contact 101 and upper contact 102 are normally closed, while center contact 101 and lower contact 103 are normally opened. An adjusting screw 104 threaded into beam 67 bears against a portion of center contact 101 when there is no load on the scale holding center contact 101 away from the upper contact 102 and against the lower contact 103. As load is imposed on the scale, the long arm 70 of the scale beam 67 rises to open the connection between the center contact 101 and the lower contact 103 and to close the connection with the upper contact 102.

A timing switch 106 having an actuating lever 107 is mounted on the frame 38 in a position for the actuating lever 107 to contact a high spot 108 on the outer surface of wheel 48. High spot 108 is positioned on wheel 48 so that it will close switch 106 at the instant the weight on the scale is to be taken. Normally, this will be after crank 52 backs pusher head 62 away from the cans, and just before it picks up another can.

Figure 3 shows the wiring diagram for the energizing of the solenoid 93. Switch 106 and contacts 101 and 103 of switch 100 are wired in series with a battery 110 and the coil of a relay 111. Relay 111 has two sets of normally opened contacts 112 and 113, respectively. A second relay 115 is also used which has a set of normally opened contacts 116 and a set of normally closed contacts 117. Relay 115 is a slow-acting relay to give a timed delay between the instant when relay 115 is energized and the instant when the normally opened contacts of that relay are closed and the normally closed contacts opened.

The normally opened contacts 112 of relay 111 are connected in series with the normally closed contacts 117 of relay 115, and are connected to bridge switch 106 and switch 100 when the contacts of both relays are closed. Normally opened contacts 113 are wired in series with a battery 118 and the coil of slow-acting relay 115. The normally opened contacts 116 are wired in series with a battery 119 and solenoid 93.

The operation of the electrical circuits is instigated by the simultaneous closing of switch 106 and contacts 101 and 103 of switch 100. The latter pair of contacts will be closed when a light-weight can is on the scale platform and switch 106 will be closed by the high spot 108 on wheel 48 at the instant the weight is to be determined. The simultaneous closing of these two switches energizes relay 111 which is locked closed by the closing of normally opened contacts 112. The closing of normally opened contacts 113 energizes slow-acting relay 115 and after a predetermined delay period the normally closed contacts 117 and the normally opened contacts 116 of the latter relay are changed in position.

The timed delay period is such as to permit pusher means 22 to move the can then resting upon switch platform 40 over onto belt 25 and to move the can then resting upon scale platform 39 (which can has just been weighed) over onto switch head 40. The closing of normally opened contacts 116 energizes solenoid 93 to pull down head 40, dropping the light-weight can that is then resting upon that head onto chute 33. The can slides down the chute onto belt 34 and is stopped on the belt by a fence 120. The opening of the closed contacts 117 deenergizes relay 111 and allows the contacts of that relay to open.

If cans not of a light weight are on the scale platform at the time when switch 106 is closed, contacts 101 and 103 will be open so that relay 111 is not energized and the head 40 of switch 23 remains in the position shown in full lines in Figure 1.

Should it be desired to use the scale for checking overweight, this may be done by adjusting the counterbalances 72 so that contacts 101 and 102 of switch 100 will close only when heavy-weight cans are on the scale and not when normal-weight cans are on the scale. In this embodiment a connection, shown in dotted lines at 112 in Figures 3, is made between contact 102 and switch 106 to replace the existing wire shown in full lines between switch 106 and contact 103. With this change, when heavy-weight cans are on the platform at the instant switch 106 is closed the contacts 101 and 102 will be also closed, actuating relay 111 and, subsequently, solenoid 93 as previously described with respect to light-weight cans.

If it is desired to reject both underweight and overweight cans, the scale beam and contacts are adjusted so that the contacts remain open for all cans having the desired weight and within the alowable tolerances. The wire from contact 103 to switch 106, shown in full lines in Figure 3, is left in place and the wire 112 from contact 102 to switch 106, shown in dotted lines in Figure 3, is also inserted. Thus when the can is underweight contacts 100 and 103 will close while if it is overweight, contacts 100 and 102 will close. In either event solenoid 93 will be energized, as previously described, rejecting that can.

In some embodiments it may be desirable to use a somewhat different wiring arrangement as illustrated in Figure 4. Here contacts 101 and 103 of switch 100 are wired in series with a battery 125, the coil of a relay 126, and a switch 127. Switch 127 and battery 125 correspond to switch 106 and battery 110, respectively, of the embodiment illustrated in Figure 3.

Relay 126 has two sets of normally opened contacts 128 and 129 respectively. Contact 129 of relay 126 is wired in series with a battery 131 and solenoid 93 to actuate the solenoid in response to the simultaneous closing of switch 127 and switch 100 as previously described.

Contact 128 forms a holding circuit through a switch 132 to provide sufficient time for the can to be moved from the scale over onto the reject switch 23. A switch 132, positioned behind switch 106 in Figure 1, is cam operated by a high spot 133 on the rear half of the periphery of wheel 48. Switch 132 remains closed between the time of the closing of switch 127 and the time that a can from scale platform 39 is moved over onto reject switch 23. Thus, if the circuit through switches 100 and 127 is closed the relay will pick up and remain locked in until the can that closed the circuit is moved over onto switch 23 so that it drops down across chute 33 and onto belt 34. The opening of switch 32 at this time allows reject switch 23 to close the gap in the cross conveyor. If switches 100 and 127 are not closed to energize relay 126, the closing of switch 132 will be ineffective for this purpose.

The foregoing description of specific embodiments is for the purpose of complying with 35 U. S. C. 112 and should not be construed as imposing unnecessary limitations upon the appended claims.

I claim:

1. A device for check weighing units, said device including a conveyor having a generally horizontal run along which units are moved in a given direction, a portion of said conveyor along said run forming a scale platform, a pivotally-mounted scale beam, said platform being supported on said beam to one side of the pivot point thereof, counterbalance means on said beam, an electrical switch actuated by said scale beam, a second portion of said conveyor just beyond said first portion, with respect to the movement of said units along said conveyor, said second portion being mounted for movement from a first position whereat it forms a part of said conveyor to a second position at which it leaves an opening in said run, and electrical means connected to said switch to position said second portion of said conveyor in one of said two positions in response to actuation of said switch.

2. A device for check weighing units, said device including a conveyor mounted on said frame and having a generally horizontal run along which units are moved at a given rate of speed in a predetermined direction, a frame, a first portion of said conveyor along said generally horizontal run forming a scale platform, a second portion just beyond, with respect to the direction of movement of said containers, said first portion, said second portion being supported from said frame for vertical movement from a first position at which said portion forms a part of said run to a second position at which an opening is left in said conveying run, a solenoid, the armature of said solenoid being attached to said second portion to hold said second portion in one of said two positions when said solenoid is energized, resilient means urging said second portion toward the other of said two positions, a scale beam supporting said platform, an electrical switch actuated by the position of said scale beam, said switch being electrically connected to said solenoid, and holding means to retain the position of said solenoid armature a given length of time after said switch is actuated.

3. A device for check weighing units, said device including a frame, a conveyor mounted on said frame and having a generally horizontal conveying run, said conveyor including means to move said units intermittently along said run in a predetermined direction, a first portion of said conveyor along said generally horizontal run forming a scale platform, a scale lever and counterbalance pivotally mounted on said frame, a member connecting said platform and said lever to transmit the motion of the platform to said lever, means mounted on said frame and attached to said member for positioning said platform in alignment with the remainder of said conveyor, an electrical switch actuated by said lever, a second portion of said conveyor just beyond, with respect to the movement of said units along said conveyor, said first portion, said second portion being mounted for movement from a first position whereat it forms a part of said conveyor to a second position at which it leaves an opening in said run, and electrical means connected to said switch to position said second portion of said conveyor in one of said two positions in response to actuation of said switch.

4. A transfer switch for a pair of discharge conveyors positioned with one above the other, said switch including a plate, said plate having a depending arm pivotally attached thereto, resilient means urging said plate into a given position with respect to said arm, a frame, a solenoid mounted on said frame with the armature thereof attached to said arm, resilient means urging said armature into a position displaced from said solenoid and into a position where said plate forms a part of the conveying surface of one of the conveyors whereby energization of the solenoid will move said plate into a second position where said plate forms a part of the conveying surface of the second conveyor, and stop means to position said plate in alignment with each of said conveyors.

5. A device for check weighing units, said device including a conveyor having a generally horizontal run along which units are moved in a given direction, a portion of said conveyor along said run forming a scale platform, a pivotally-mounted scale beam, said platform being supported on said beam to one side of the pivot point thereof, counterbalance means on said beam, an electrical switch actuated by said scale beam, a pair of snubbers for said beam to limit the motion of the beam in either direction, said snubbers being positioned to permit only a small movement of the scale beam, a second portion of said conveyor just beyond said first portion, with respect to the movement of said units along said conveyor, said second portion being mounted for movement from a first position whereat it forms a part of said conveyor to a second position at which it leaves an opening in said run, and electrical means connected to said switch to position said second portion of said conveyor in one of said two positions in response to actuation of said switch.

6. A device for check weighing units, said device including a frame, a conveyor mounted on said frame and having a generally horizontal conveying run along which units are moved in a given direction, said conveyor including means to move said units intermittently along said run in a predetermined direction, a first portion of said conveyor along said generally horizontal run forming a scale platform, a scale lever and counterbalance pivotally mounted on said frame, said lever being mounted to have a short arm and a long arm, said platform being attached to said short arm, an electrical switch actuated by the portion of said lever adjacent the end of said long arm, a pair of snubbers for said lever to limit the motion of the lever in either direction, said snubbers being mounted on said frame and being positioned to permit only a small movement of the scale lever to either side of the balance point for units of the desired weight, a transfer switch for said conveyor positioned beyond said platform, with respect to the direction of movement of said units, and electrical means to actuate said transfer switch, said electrical means being connected to said electrical switch for positioning of the transfer switch in response to the actuation of said electrical switch.

7. A scale as in claim 6 wherein the snubbers are positioned to permit a movement of the end of said long arm of not more than about one-sixteenth of an inch.

8. A check weighing scale for weighing units, said scale including a scale beam pivotally mounted on said frame adjacent one end of the beam whereby said beam is divided into a short and a long arm, a scale platform mounted on said short arm, an electrical switch having a spring mounted actuating arm, means on said beam to contact said actuating arm, the top and bottom sides of the long arm of said beam tapering to a smaller dimension toward the other end of said beam, and a pair of snubbers mounted in said frame for movement in a generally horizontal direction, along lines generally parallel to said beam, said snubbers being positioned to either side of the other end of said beam.

References Cited in the file of this patent
UNITED STATES PATENTS

| | | |
|---|---|---|
| 1,728,463 | Wyland | Sept. 17, 1929 |
| 1,979,722 | Zworykin | Nov. 6, 1934 |
| 2,076,617 | Cleaves | Apr. 13, 1937 |
| 2,286,686 | Muddiman | June 16, 1942 |
| 2,323,023 | Flanagan | June 29, 1943 |
| 2,394,593 | Christmann | Feb. 12, 1946 |
| 2,538,346 | Wood | Jan. 16, 1951 |
| 2,566,958 | Peterson | Sept. 4, 1951 |
| 2,573,848 | Kirchner | Nov. 6, 1951 |
| 2,590,704 | Howard | Mar. 25, 1952 |
| 2,596,319 | Wimmer | May 13, 1952 |
| 2,597,831 | Willis | May 20, 1952 |
| 2,616,652 | Rose | Nov. 4, 1952 |
| 2,628,055 | Knobel | Feb. 10, 1953 |

FOREIGN PATENTS

| | | |
|---|---|---|
| 83,606 | Sweden | June 12, 1935 |